United States Patent
Inoue et al.

(10) Patent No.: US 9,211,496 B2
(45) Date of Patent: Dec. 15, 2015

(54) ABSORBENT, $CO_2$ OR $H_2S$ REDUCING APPARATUS, AND $CO_2$ OR $H_2S$ REDUCING METHOD USING ABSORBENT

(71) Applicants: MITSUBISHI HEAVY INDUSTRIES, LTD., Tokyo (JP); THE KANSAI ELECTRIC POWER CO., INC., Osaka-shi, Osaka (JP)

(72) Inventors: Yukihiko Inoue, Kanagawa (JP); Ryuji Yoshiyama, Hiroshima (JP); Tsuyoshi Oishi, Hiroshima (JP); Masaki Iijima, Hiroshima (JP); Masazumi Tanoura, Kanagawa (JP); Tomio Mimura, Hyogo (JP); Yasuyuki Yagi, Hyogo (JP)

(73) Assignees: MITSUBISHI HEAVY INDUSTRIES, LTD., Tokyo (JP); THE KANSAI ELECTRIC POWER CO., LTD., Osaka-shi (JP)

( * ) Notice: Subject to any disclaimer, the term of this patent is extended or adjusted under 35 U.S.C. 154(b) by 0 days.

(21) Appl. No.: 14/066,096

(22) Filed: Oct. 29, 2013

(65) Prior Publication Data

US 2014/0056792 A1    Feb. 27, 2014

Related U.S. Application Data

(62) Division of application No. 12/665,393, filed as application No. PCT/JP2008/061053 on Jun. 17, 2008, now Pat. No. 8,597,418.

(30) Foreign Application Priority Data

Jun. 18, 2007  (JP) .................. 2007-160657

(51) Int. Cl.
   *B01D 53/14*    (2006.01)
   *B01D 53/18*    (2006.01)

(52) U.S. Cl.
   CPC ........ *B01D 53/1493* (2013.01); *B01D 53/1462* (2013.01); *B01D 53/18* (2013.01); *B01D 2257/304* (2013.01); *B01D 2257/504* (2013.01); *Y02C 10/04* (2013.01); *Y02C 10/06* (2013.01)

(58) Field of Classification Search
   CPC ........... B01D 53/1493; B01D 53/1462; B01D 53/18; B01D 2257/304; B01D 2257/504; Y02C 10/04; Y02C 10/06
   USPC ........................... 95/149–266; 423/210–248; 96/243–371; 252/190; 422/168
   See application file for complete search history.

(56) References Cited

U.S. PATENT DOCUMENTS 3,535,260 A    10/1970  Singh
3,856,921 A    12/1974  Shrier et al.
(Continued)

FOREIGN PATENT DOCUMENTS

CA    2625769 A1        4/2007
DE    10-2005-050385 A1    4/2007
(Continued)

OTHER PUBLICATIONS

International Search Report of PCT/JP2008/061053, mailing date of Oct. 7, 2008.
(Continued)

*Primary Examiner* — Thomas McKenzie
(74) *Attorney, Agent, or Firm* — Westerman, Hattori, Daniels & Adrian, LLP

(57) ABSTRACT

An absorbent according to the present invention absorbs $CO_2$ or $H_2S$ contained in flue gas emitted from a power generating plant such as a thermal plant, and contains three or more amine compounds selected from linear or cyclic amine compounds having a primary amino group, and linear or cyclic amine compounds having a secondary amino group. By way of a synergetic effect of the mixture of these compounds, the absorption speed of $CO_2$ or $H_2S$ absorption is improved. A small amount of $CO_2$ contained in a large amount of boiler flue gas can be absorbed efficiently.

3 Claims, 1 Drawing Sheet

(56) References Cited

U.S. PATENT DOCUMENTS

| | | | |
|---|---|---|---|
| 4,273,937 A | 6/1981 | Gum et al. | |
| 4,336,233 A | 6/1982 | Appl et al. | |
| 4,344,863 A | 8/1982 | Robbins et al. | |
| 4,405,577 A | 9/1983 | Sartori et al. | |
| 4,446,119 A | 5/1984 | DuPart et al. | |
| 4,483,833 A | 11/1984 | Stogryn et al. | |
| 4,537,753 A | 8/1985 | Wagner et al. | |
| 4,595,723 A * | 6/1986 | Henson et al. | 524/398 |
| 4,696,803 A | 9/1987 | Nieh | |
| 4,814,104 A | 3/1989 | Kubek et al. | |
| 4,840,777 A | 6/1989 | Faucher | |
| 5,246,619 A | 9/1993 | Niswander | |
| 5,603,908 A * | 2/1997 | Yoshida et al. | 423/220 |
| 5,618,506 A | 4/1997 | Suzuki et al. | |
| 5,648,053 A | 7/1997 | Mimura et al. | |
| 5,700,437 A | 12/1997 | Fujii et al. | |
| 5,876,488 A | 3/1999 | Birbara et al. | |
| 5,904,908 A | 5/1999 | Suzuki et al. | |
| 6,036,931 A | 3/2000 | Yoshida et al. | |
| 6,051,161 A | 4/2000 | Suzuki et al. | |
| 6,165,432 A | 12/2000 | Rooney | |
| 6,165,433 A | 12/2000 | Chakravarti et al. | |
| 6,207,121 B1 | 3/2001 | Rooney | |
| 6,267,939 B1 | 7/2001 | Gemes et al. | |
| 6,270,739 B1 | 8/2001 | Barnicki et al. | |
| 6,337,059 B1 | 1/2002 | Schubert et al. | |
| 6,423,282 B1 | 7/2002 | Araki et al. | |
| 6,436,174 B1 | 8/2002 | Grossmann et al. | |
| 6,500,397 B1 | 12/2002 | Yoshida et al. | |
| 6,582,498 B1 | 6/2003 | Sass et al. | |
| 6,689,332 B1 | 2/2004 | Yoshida et al. | |
| 6,784,320 B2 | 8/2004 | Mimura et al. | |
| 6,852,144 B1 | 2/2005 | Wagner et al. | |
| 7,004,997 B2 | 2/2006 | Asprion et al. | |
| 7,056,482 B2 | 6/2006 | Hakka et al. | |
| 7,316,737 B2 | 1/2008 | Mimura et al. | |
| 7,374,734 B2 | 5/2008 | Grossman et al. | |
| 7,481,988 B2 | 1/2009 | Katz et al. | |
| 7,901,487 B2 | 3/2011 | Rochelle | |
| 8,147,593 B2 * | 4/2012 | Mimura et al. | 95/235 |
| 2004/0036055 A1 * | 2/2004 | Asprion et al. | 252/180 |
| 2004/0253159 A1 | 12/2004 | Hakka et al. | |
| 2005/0166756 A1 | 8/2005 | Brok et al. | |
| 2005/0211092 A1 | 9/2005 | Nielsen et al. | |
| 2006/0138384 A1 | 6/2006 | Grossman et al. | |
| 2006/0162559 A1 | 7/2006 | Asprion et al. | |
| 2006/0185512 A1 | 8/2006 | Schubert | |
| 2007/0044658 A1 | 3/2007 | Rochelle et al. | |
| 2008/0078292 A1 | 4/2008 | Mimura et al. | |
| 2008/0098892 A1 | 5/2008 | Asprion et al. | |
| 2009/0199713 A1 | 8/2009 | Asprion et al. | |
| 2009/0277330 A1 * | 11/2009 | Yoshiyama et al. | 95/186 |
| 2010/0126348 A1 | 5/2010 | Shimizu et al. | |
| 2010/0180764 A1 | 7/2010 | Inoue et al. | |
| 2011/0214566 A1 | 9/2011 | Lee et al. | |
| 2012/0148466 A1 | 6/2012 | Mejdell et al. | |

FOREIGN PATENT DOCUMENTS

| | | |
|---|---|---|
| EP | 0 121 109 A2 | 10/1984 |
| EP | 0 705 637 A1 | 4/1996 |
| EP | 0 880 991 A1 | 12/1998 |
| EP | 1 016 445 A1 | 7/2000 |
| EP | 1 872 846 A1 | 1/2008 |
| GB | 1058304 A | 2/1967 |
| GB | 2130568 A * | 6/1984 |
| JP | 5-123535 A | 5/1993 |
| JP | 5-301024 A | 11/1993 |
| JP | 6-343858 A | 12/1994 |
| JP | 7-51537 A | 2/1995 |
| JP | 8-252430 A | 10/1996 |
| JP | 8-257354 A | 10/1996 |
| JP | 2001-025627 A | 1/2001 |
| JP | 3233809 B2 | 12/2001 |
| JP | 2003-230812 A | 8/2003 |
| JP | 2004-504131 A | 2/2004 |
| JP | 2006-167520 A | 5/2006 |
| JP | 2008-013400 A | 1/2008 |
| JP | 2008-168227 A | 7/2008 |
| JP | 2008-307519 A | 12/2008 |
| JP | 2009-213972 A | 9/2009 |
| JP | 4634384 B2 | 2/2011 |
| JP | 4690659 B2 * | 6/2011 |
| JP | 2011-194388 A | 10/2011 |
| JP | 52-63171 B2 | 8/2013 |
| RU | 2080908 C1 | 6/1997 |
| RU | 2227060 C2 | 4/2004 |
| SU | 326765 A | 1/1972 |
| SU | 1725988 A1 | 4/1992 |
| WO | 00/66249 A1 | 11/2000 |
| WO | 2000/66249 A1 | 11/2000 |
| WO | WO 2006107026 A1 * | 10/2006 |
| WO | 2007141884 A1 | 12/2007 |
| WO | WO 2007141884 A1 * | 12/2007 |
| WO | 2009/001804 A1 | 12/2008 |

OTHER PUBLICATIONS

Russian Office Action dated Jan. 17, 2011, issued in corresponding Russian Patent Application No. 2010101220 with English Translation.
Supplementary European Search Report dated Apr. 11, 2011, issued in corresponding European Patent Application No. 08765686.4.
Russian Office Action dated Oct. 25, 2011, issued in corresponding Russian Patent Application No. 2010101220, with English Translation.
Japanese Office Action dated Mar. 6, 2012, issued in corresponding application 2007-160657, with English translation (8 pages).
Canadian Notice of Allowance dated Aug. 21, 2013, issued in corresponding Canadian Patent Application No. 2692154 (1 page).
Notification of Intent to Grant dated Nov. 13, 2014, issued in European Application No. 08765 686.4. (21 pages).
International Search Report dated Jan. 22, 2013, issued in Application No. PCT/JP2012/076853.
Written Opinion of the International Search Authority dated Jan. 22, 2013, issued in Application No. PCT/JP2012/076853, with English translation.
International Search Report dated Jun. 20, 2006, issued in Application No. PCT/JP2006/307054.
Office Action dated Jan. 22, 2009, issued in Canadian Patent Application No. 2576454 (3 pages).
Extended European Search Report dated Sep. 3, 2010, issued in Patent Application No. 06731002.9 (9 pages).
Decision to Grant a Patent dated Oct. 26, 2010, issued in Jpanese Patent Application No. 2006-526455, with English translation (3 pages).
Notice of Allowance and Fee(s) due dated Nov. 22, 2011, issued in U.S. Appl. No. 11/659,975 (8 pages).
Office Action dated Jun. 24, 2011, issued in U.S. Appl. No. 11/659,975 (11 pages).
Office Action dated Mar. 4, 2011, issued in U.S. Appl. No. 11/659,975 (20 pages).
Office Action dated Oct. 14, 2010, issued in U.S. Appl. No. 11/659,975 (9 pages).
Office Action dated Jan. 28, 2010, issued in U.S. Appl. No. 11/659,975 (7 pages).
Office Action dated May 21, 2015, issued in counterpart Australian application No. 2012327104 (4 pages).
Extended European Search Report dated May 26, 2015, issued in counterpart application No. 12842195.5 (6 pages).
Office Action dated Jun. 9, 2015, issued in counterpart Canadian application No. 2,851,092 (7 pages).
Office Action dated Feb. 3, 2015, issued in Japanee Patent Application No. 2011-232135, with English translation (10 pages).
Non-Final Office Action dated Oct. 15, 2015, issued in U.S. Appl. No. 14/347,852 (53 pages).

* cited by examiner

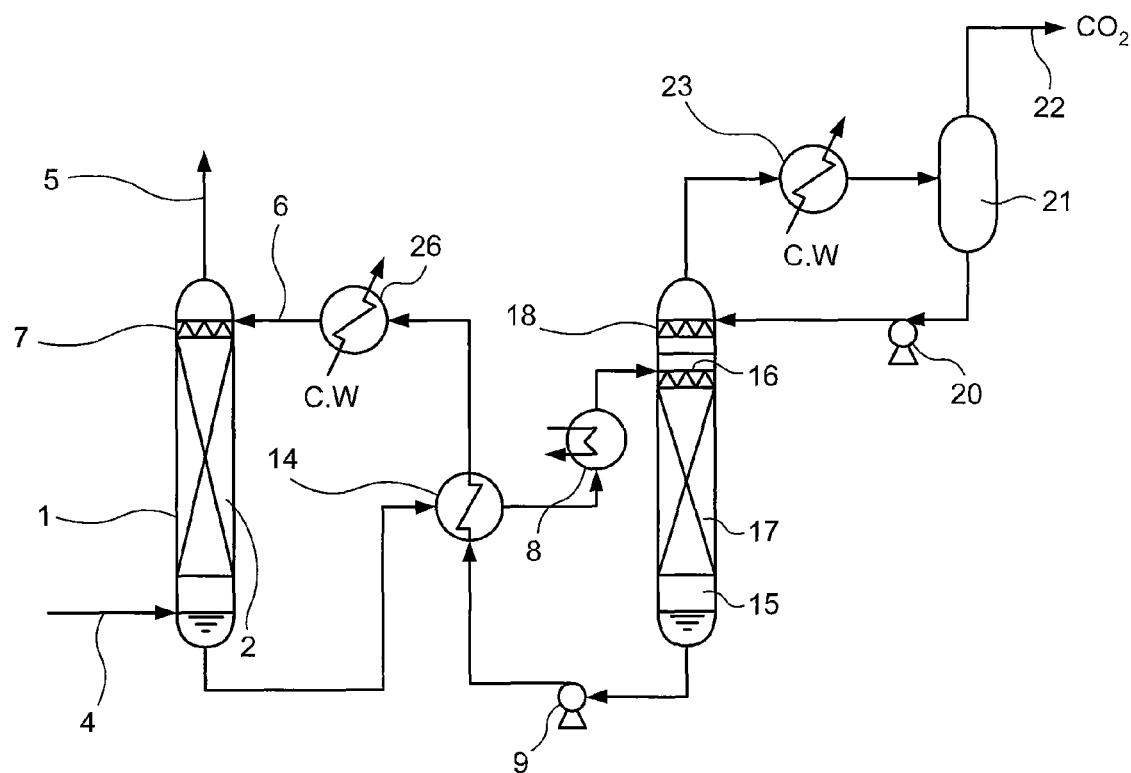

ABSORBENT, $CO_2$ OR $H_2S$ REDUCING APPARATUS, AND $CO_2$ OR $H_2S$ REDUCING METHOD USING ABSORBENT

CROSS-REFERENCE TO RELATED APPLICATION

This is a divisional of U.S. application Ser. No. 12/665,393, filed on Dec. 18, 2009, which is a 371 of PCT/2008/061053 filed on Jun. 17, 2008, the entire contents of which is incorporated herein by reference.

TECHNICAL FIELD

The present invention relates to an absorbent that reduces $CO_2$ (carbon dioxide) or $H_2S$ (hydrogen sulfide) contained in gas such as combustion flue gas, and to a $CO_2$ or $H_2S$ reducing apparatus and a $CO_2$ or $H_2S$ reducing method using the absorbent.

BACKGROUND ART

It has come to be pointed out that one of the causes of the global warming is a greenhouse effect of $CO_2$, and it has became an urgent task, also internationally, to provide a countermeasure for $CO_2$ to protect the global environment against the warming. $CO_2$ is generated by any human activities combusting fossil fuels, and there are increasing demands for suppressing $CO_2$ emissions. Along with such an increasing demand, researches are energetically investing a method for reducing and collecting $CO_2$ in combustion flue gas, and storing therein collected $CO_2$ without releasing it to the air, by bringing combustion flue gas emitted from a steam generator in contact with aqueous alkanolamine solution and the like, for applications in a power plant that consumes a large amount of fossil fuels, such as a thermal plant. In addition, it has been suggested that the aqueous alkanolamine solution can reduce acid gas such as $H_2S$ (hydrogen sulfide), as well as $CO_2$ (carbon dioxide).

Examples of the alkanolamines include monoethanolamine (MEA), triethanolamine (TEA), N-methyldiethanolamine (MDEA), diisopropanolamine (DIPA), and diglycolamin (DGA), and usually monoethanolamine (MEA) is preferably used. In addition, it has been suggested to use a cyclic amine such as piperazine as an auxiliary absorbing agent in these alkanolamines (Patent Document 1).

[Patent Document 1] U.S. Pat. No. 3,233,809
[Patent Document 2] Japanese Patent Application Laid-open No. H06-343858
[Patent Document 3] Japanese Patent Application Laid-open No. H08-257354
[Patent Document 4] Japanese Patent Application Laid-open No. H08-252430
[Patent Document 5] Japanese Patent Application Laid-open No. H06-343858

DISCLOSURE OF INVENTION

Problem to be Solved by the Invention

To efficiently collect $CO_2$ or $H_2S$ contained in a large volume of flue gas emitted from a steam generator in a large turbine facility and the like, there is a demand for an absorbent having a $CO_2$ or $H_2S$ absorption speed as high as possible.

In response to this issue, it has been suggested to employ a primary amine having a high absorption speed, together with another additive component to obtain a binary absorbent (Patent Documents 2 and 3). It has also been suggested to obtain a binary absorbent consisting of a secondary amine and a tertiary amine (Patent Document 4). However, either of these absorbent is not in practical use yet.

Tertiary amine is suggested to use for ternary absorbent (Patent Document 5). This absorbent is for absorbing and reducing a relatively large quantity of $CO_2$ or $H_2S$ contained in natural gas, heavy oil synthesis gas, or oil refinery gas. In addition, the $CO_2$ absorption speed of a tertiary amine is low. Thus, there is a problem from a perspective of a practical use of efficiently reducing $CO_2$ or $H_2S$ existing in a low concentration in flue gas emitted from a steam generator in a large turbine facility and the like.

In consideration of the above, an object of the present invention is to provide an absorbent that can dramatically improve the reduction speed of $CO_2$ or $H_2S$ contained in combustion flue gas, further to improve $CO_2$ or $H_2S$ reduction efficiency, and to provide a $CO_2$ or $H_2S$ reducing apparatus and a $CO_2$ or $H_2S$ reducing method using such an absorbent.

Means for Solving Problem

According to an aspect of the present invention, an absorbent that absorbs $CO_2$ or $H_2S$ contained in gas, the absorbent comprising three or more amine compounds selected from linear or cyclic amine compounds having a primary amino group, and linear or cyclic amine compounds having a secondary amino group.

Advantageously, in the absorbent, the three amine compounds includes two amine compounds selected from linear amine compounds having a primary amino group or linear amine compounds having a secondary amino group, and a cyclic amine compound having a primary or a secondary amino group.

Advantageously, in the absorbent, the three amine compounds includes two amine compounds including one compound selected from linear amine compounds having a primary amino group and another compound selected from linear amine compounds having a secondary amino group, and a cyclic amine compound having a primary or a secondary amino group.

Advantageously, in the absorbent, the three amine compounds includes two amine compounds selected from linear amine compounds having a secondary amino group, and a cyclic amine compound having a primary or a secondary amino group.

Advantageously, in the absorbent, a compounding ratio of the three amine compounds is: 2-n-butylaminoethanol (n-BAE) or 2-ethylaminoethanol (EAE) used as a main component accounting for 30 to 55 weight percent; two amine compounds selected from linear or cyclic amine compounds having a primary amino group, and linear or cyclic amine compounds having a secondary amino group used as minor components accounting for 1 to 30 weight percent; and water accounting for the remaining weight percent.

Advantageously, in the absorbent, a compounding ratio of the three amine compounds is: 2-n-butylaminoethanol (n-BAE) or 2-ethylaminoethanol (EAE) used as a main component accounting for 30 to 55 weight percent; two amine compounds selected from linear or cyclic amine compounds having a primary amino group, and linear or cyclic amine compounds having a secondary amino group used as minor components accounting for 1 to 30 weight percent; and water accounting for the remaining weight percent, and two amine compounds include: a linear or cyclic amine compound having a primary amino group used as a first minor component accounting for 15 to 5 weight percent; and two amine compounds selected from linear or cyclic amine compounds having a secondary amino group used as second minor components accounting for 10 to 1 weight percent; and the water accounting for the remaining weight percent.

Advantageously, in the absorbent, a compounding ratio of the three amine compounds is: 2-n-butylaminoethanol (n-BAE) or 2-ethylaminoethanol (EAE) used as a main component accounting for 30 to 55 weight percent; two amine compounds selected from linear or cyclic amine compounds having a primary amino group, and linear or cyclic amine compounds having a secondary amino group used as minor components accounting for 1 to 30 weight percent; and water accounting for the remaining weight percent, and the two amine compounds includes two selected from piperazine (P), methylpiperazine (MP), hydroxyethylpiperazine (HEP), monoethanolamine (MEA), diethanolamine (DEA), diisopropanolamine (DIPA), diglycolamin (DGA), 3-amino-1-propanol (AP), 2-amino-2-methylpropanol (AMP), 2-methylaminoethanol (MAE), 2-ethylaminoethanol (EAE), 2-n-propylaminoethanol (n-PAE), 2 n-butylaminoethanol (n-BAE), 2-isopropylaminoethanol (i-PAE), 2-isobutylaminoethanol (i-BAE), 1-(2-aminoethyl)piperazine (AEPRZ), and piperidinol (PDN).

Advantageously, in the absorbent, a compounding ratio of the three amine compounds is: 2-n-butylaminoethanol (n-BAE) or 2-ethylaminoethanol (EAE) used as a main component accounting for 30 to 55 weight percent; two amine compounds selected from linear or cyclic amine compounds having a primary amino group, and linear or cyclic amine compounds having a secondary amino group used as minor components accounting for 1 to 30 weight percent; and water accounting for the remaining weight percent, and the two amine compounds include: a linear or a cyclic amine compound having a primary amino group used as a first minor component accounting for 15 to 5 weight percent; two amine compounds selected from linear or cyclic amine compounds having a secondary amino group used as second minor components accounting for 10 to 1 weight percent; and the water accounting for the remaining weight percent, and the two amine compounds includes two selected from piperazine (P), methylpiperazine (MP), hydroxyethylpiperazine (HEP), monoethanolamine (MEA), diethanolamine (DEA), diisopropanolamine (DIPA), diglycolamin (DGA), 3-amino-1-propanol (AP), 2-amino-2-methylpropanol (AMP), 2-methylaminoethanol (MAE), 2-ethylaminoethanol (EAE), 2-n-propylaminoethanol (n-PAE), 2-n-butylaminoethanol (n-BAE), 2-isopropylaminoethanol (i-PAE), 2-isobutylaminoethanol (i-BAE), 1-(2-aminoethyl)piperazine (AEPRZ), and piperidinol (PDN).

According to another aspect of the present invention, a $CO_2$ or $H_2S$ reducing apparatus that reduces $CO_2$ or $H_2S$ contained in gas, includes: an absorber that brings gas containing $CO_2$ or $H_2S$ into contact with absorbent to reduce $CO_2$ or $H_2S$ contained in the gas; and a regenerator that recycles a solvent that has absorbed $CO_2$ or $H_2S$. The solvent having $CO_2$ or $H_2S$ reduced and recycled in the regenerator is reused in the absorber, and the absorbent described above is used.

According to still another aspect of the present invention, a $CO_2$ or $H_2S$ reducing method that reduces $CO_2$ or $H_2S$ contained in gas by using an absorber that brings gas containing $CO_2$ or $H_2S$ into contact with absorbent to reduce $CO_2$ or $H_2S$ contained in the gas and a regenerator that recycles a solvent that has absorbed $CO_2$ or $H_2S$ so that the solvent having $CO_2$ or $H_2S$ reduced and recycled in the regenerator is reused in the absorber, the $CO_2$ or $H_2S$ reducing method includes: Using the absorbent described above.

The gas containing $CO_2$ or $H_2S$ is preferably combustion flue gas emitted from a combustion facility (such as a steam generator).

Effect of the Invention

According to the present invention, as an amine compound that absorbs one of $CO_2$ and $H_2S$ or both contained in gas, an amine compound contains three or more amine compounds selected from linear or cyclic amine compounds having a primary amino group, linear or cyclic amine compounds having a secondary amino group. Therefore, an excellent $CO_2$ or $H_2S$ reducing performance is achieved.

BRIEF DESCRIPTION OF DRAWINGS

FIG. 1 is a schematic of a $CO_2$ reducing apparatus.

EXPLANATIONS OF LETTERS OR NUMERALS

1 absorber
15 regenerator

BEST MODE(S) FOR CARRYING OUT THE INVENTION

The present invention will now be explained in detail with reference to the drawing. It should be understood that an embodiment of the present invention is not intended to limit the scope of the present invention in any way. Furthermore, the embodiment shall be construed to include structural elements that can be easily imagined by those in the art, or those that are substantially identical.

Embodiment of Present Invention

An absorbent according to the present invention is one that absorbs $CO_2$ or $H_2S$ contained in flue gas (hereinafter, "gas") emitted from a power generating plant such as a thermal plant, and contains three or more amine compounds selected from linear or cyclic amine compounds having a primary amino group, and linear or cyclic amine compounds having a secondary amino group.

Examples of the linear or the cyclic amine compounds having a primary amino group include mono-n-butylamine (MBA), monoethylamine (MEA), n-propanolamine (NPA), 2-amino-2-methylpropanol (AMP), and diglycolamin (DGA).

Examples of the linear or the cyclic amine compounds having a secondary amino group include 2-methylaminoethanol (MAE), 2-ethylaminoethanol (EAE), 2-n-propylaminoethanol (n-PAE), 2-n-butylaminoethanol (n-BAE), 2-isopropylaminoethanol (i-PAE), 2-isobutylaminoethanol (i-BAE), piperazine (P), 2-methylpiperazine (MP), 1-(2-aminoethyl)piperazine (AEPRZ), and piperidinol (PDN).

The three amine compounds preferably include two amine compounds selected from linear amine compounds having a primary amino group, and linear amine compounds having a secondary amino group, and a cyclic amine compound having a primary or a secondary amino group.

The three amine compounds preferably include two amine compounds having a compound selected from linear amine compounds having a primary amino group and another compound selected from linear amine compounds having a secondary amino group, and a cyclic amine compound having a primary or a secondary amino group.

The three amine compounds preferably include two amine compounds selected from linear amine compounds having a secondary amino group, and a cyclic amine compound having a primary or a secondary amino group.

An especially preferable combination includes a combination of one selected from MEA and AMP as the linear amine compound having a primary amino group; one selected from MAE, EAE, and BAE as the linear amine compounds having a secondary amino group; and one selected from P, MP, and AEPRZ as the cyclic amine compounds having a primary or a secondary amino group.

Compounding ratio of the three amine compounds, it is preferable to use 2-n-butylaminoethanol (n-BAE) or 2-ethylaminoethanol (EAE) as a main component that accounts for 30 to 55 weight percent; and to use two amine compounds selected from linear or cyclic amine compounds having a primary amino group, and linear or cyclic amine compounds having a secondary amino group as minor components that account for 1 to 30 weight percent; and to use water for the remaining weight percent. Furthermore, MEA (primary amine compound), AMP (primary amine compound), and MAE (secondary amine compound) may be used as the main component. In addition, it is preferable to use MEA, AMP, and the like also as the minor component.

Furthermore, preferably, the two amine compounds that are the minor components include a first minor component and a second minor component; and a linear or a cyclic amine compound having a primary amino group is used as the first minor component accounting for 15 to 5 weight percent; two amine compounds selected from linear or cyclic amine compounds having a secondary amino group are used as the second minor components accounting for 10 to 1 weight percent; and the remaining weight percent is water.

Preferably, the two amine compounds are, for example, two selected from piperazine (P), methylpiperazine (MP), hydroxyethylpiperazine (HEP), monoethanolamine (MEA), diethanolamine (DEA), diisopropanolamine (DIPA), diglycolamin (DGA), 3-amino-1-propanol (AP), 2-amino-2-methylpropanol (AMP), 2-methylaminoethanol (MAE), 2-ethylaminoethanol (EAE), 2-n-propylaminoethanol (n-PAE), 2-n-butylaminoethanol (n-BAE), 2-isopropylaminoethanol (i-PAE), 2-isobutylaminoethanol (i-BAE), 1-(2-aminoethyl) piperazine (AEPRZ), and piperidinol (PDN).

If 2-ethylaminoethanol (EAE) is used as the main component, it is especially preferable to use two out of piperazine (P), 1-(2-aminoethyl)piperazine (AEPRZ), methylpiperazine (MP), 2-amino-2-methylpropanol (AMP), and piperidinol (PDN) as the minor components.

If 2-ethylaminoethanol (EAE) is used as the main component, it is especially preferable to use two out of piperazine (P), 1-(2-aminoethyl)piperazine (AEPRZ), and 2-amino-2-methylpropanol (AMP) as the minor components.

The component other than amines is usually water; however, other solvent or mixture of water and other solvent may also be used. Furthermore, corrosion inhibitor, antidegrant, and the like are added as required.

According to the present invention, the temperature of the absorbent when the liquid is brought into contact with gas is usually in a range of 30 to 70 Celsius degrees.

Applicable gas conditions for the present invention are represented by a total pressure of approximately atmospheric pressure and $CO_2$ concentration of 10 percent; however, such conditions are not limited thereto.

Examples of gas processed by the present invention include, for example, coal gasification gas, synthesis gas, coke oven gas, petroleum gas, or natural gas; however, these examples are not limited thereto, and the present invention is applicable to any gas containing acid gas such as $CO_2$ or $H_2S$.

No special limitation is set to a process that can be used for a method for reducing any one of $CO_2$ and $H_2S$ or both according to the present invention. An exemplary reducing apparatus for reducing $CO_2$ will now be explained with reference to FIG. 1.

FIG. 1 is a schematic of the $CO_2$ reducing apparatus. As shown in FIG. 1, gas is guided through a $CO_2$-containing gas supplying opening 4 into an absorber 1. The gas confined in the absorber 1 is brought in a counter-current contact with $CO_2$ absorbent supplied from a nozzle 7 in a filler 2. $CO_2$ included in the gas is absorbed and reduced by the absorbent, and the gas is ejected from a $CO_2$-reduced gas ejecting opening 5. The absorbent supplied to the absorber 1 absorbs $CO_2$, sent to a heat exchanger 14 and a heater 8 to be heated, and further sent to the regenerator 15. In the regenerator 15, the absorbent goes through a nozzle 16 and a filler 17, and flows downwardly. During this time, $CO_2$ becomes desorbed, and the absorbent is rejuvenated. The rejuvenated absorbent is caused to go through the heat exchanger 14 and an absorbent cooler 26 by way of a pump 9, and fed back to the absorber 1 through an absorbent supplying opening 6. The $CO_2$ desorbed from the absorbent is brought in contact with refluxing water supplied from a nozzle 18 at the upper area of the regenerator 15, and cooled in a regenerator reflux cooler 23. In a reflux drum 21, the steam that accompanies $CO_2$ is separated from condensed refluxing water, and guided to a $CO_2$ collection process by way of a collected $CO_2$ line 22. The refluxing water is sent to the regenerator 15 by way of a refluxing water pump 20. In this embodiment, only a general structure is described, and auxiliary equipment is partially omitted in the description.

By using the absorbent according to the present invention as the absorbent in the $CO_2$ reducing apparatus, $CO_2$ can be absorbed and reduced efficiently.

Embodiment

The present invention will now be explained in detail based on an embodiment of the present invention.

According to the embodiment, as shown in Table 1, when 2-n-butylaminoethanol (n-BAE) is used as a main component, two out of piperazine (P), 1-(2-aminoethyl)piperazine (AEPRZ), methylpiperazine (MP), 2-amino-2-methylpropanol (AMP), and piperidinol (PDN) are used as minor components to produce each of the absorbents.

As shown in Table 1, when 2-ethylaminoethanol (EAE) is used as a main component, two out of piperazine (P), 1-(2-aminoethyl)piperazine (AEPRZ), and 2-amino-2-methylpropanol (AMP) are used as minor components to produce each of the absorbents.

As comparative examples, a binary combination of 2-ethylaminoethanol (EAE) and 1-(2-aminoethyl)piperazine (AEPRZ) (comparative example 1), a combination of diethanolamine (DEA) and piperazine (P) (comparative example 2), and a ternary system using tertiary amine with a combination of hydroxyethylpiperazine (HEP), piperazine (P), and methyldiethanolamine (MDEA) (comparative example 3) are produced as absorbents.

In the table, the numbers in parenthesis represent weight percent.

In the second column of the table, "Molar Content per 1.4 Mol" indicates a ratio of a weight percent converted into M (Mol/liter), so that the sum of each of the components becomes 1.4 mol.

In third column of the table, "Singular Performance in Amount Corresponding to Content" indicates (singular performance at 1.4 mol)÷1.4×(molar content).

In fourth column of the table, "Linear Prediction" is the sum of the singular performance of each of the components in the amount corresponding to the content, without giving any consideration to interaction.

In sixth column of the table, "Synergetic Effect" indicates a quantity of synergetic effect calculated by subtracting the linear prediction from the compound liquid measured, and a synergetic effect (percent) is calculated by (the quantity of synergetic effect)÷(linear prediction)×100.

<Test Description>

To obtain an exact reaction speed between the absorbent and $CO_2$, a flat-contact churn type testing apparatus (inner diameter: 11.5 centimeters, gas contact area: 91.61 square centimeters, bathing temperature: 25 Celsius degrees) having churn blades in a basin was used. An absorption speed was measured for each of the absorbents, while the partial pressure of gas-phase $CO_2$ was changed respectively at a constant speed while maintaining an amine concentration constant.

For the analysis of $CO_2$ concentration, an infrared $CO_2$ analyzer was used.

The results are indicated in Table 1, as a synergetic effect of the mixtures expressed by a square root of a reaction speed constant ($m^3$/kmol·s).

surement with the compound liquid did not score high, not allowing us to obtain the synergetic effect.

Furthermore, for the comparative examples 2 and 3, the linear predictions were equal to or less than 30; therefore, the synergetic effect cannot be expected.

In Table 1, we confirmed that we can especially expect a great synergetic effect in the ternary absorbent of the test example 3 consisting of a combination of n-BAE, P, and AMP. The results were good as well when MP or AEPRZ was used instead of P.

INDUSTRIAL APPLICABILITY

As described above, the absorbent according to the present invention improves the $CO_2$ absorption speed. Therefore, a small amount of $CO_2$ contained in a large amount of boiler flue gas can be absorbed efficiently. Thus, the absorbent according to the present invention is suitable for processing flue gas emitted from a plant facility such as various types of steam generators.

What is claimed:

1. An absorbent that absorbs $CO_2$ or $H_2S$ contained in gas, the absorbent comprising:
   a main component which is 2-ethylaminoethanol (EAE);
   minor components selected from any one of the following combinations:

|  |  | Molar Content per 1.4 Mol *1 | | | Singular Performance in Amount corresponding to Content *2 | | | Linear Prediction *3 | Compound Liquid Measured | Synergetic Effect Quantity *4 | % *5 |
|---|---|---|---|---|---|---|---|---|---|---|---|
| TEST-1 | BAE (40) + P (9) + AEPRZ (3) | n-BAE 1.019 | P 0.321 | AEPRZ 0.069 | n-BAE 46.1 | P 24.5 | AEPRZ 4.7 | 75.3 | 92.8 | 17.5 | 23.3 |
| TEST-2 | n-BAE (40) + P (9) + MP (6) | n-BAE 0.945 | P 0.289 | MP 0.166 | n-BAE 42.7 | P 22.7 | MP 11.1 | 76.5 | 90.4 | 13.9 | 18.1 |
| TEST-3 | n-BAE (40) + P (9) + AMP (6) | n-BAE 0.931 | P 0.285 | AMP 0.184 | n-BAE 42.1 | P 22.4 | AMP 2.7 | 67.2 | 89.8 | 22.6 | 33.5 |
| TEST-4 | n-BAE (40) + P (9) + PDN (6) | n-BAE 0.946 | P 0.290 | PDN 0.164 | n-BAE 42.8 | P 22.8 | PDN 11.3 | 76.9 | 86.7 | 9.8 | 12.8 |
| TEST-5 | EAE (40) + P (9) + AEPRZ (3) | EAE 1.090 | P 0.254 | AEPRZ 0.056 | EAE 56.6 | P 19.9 | AEPRZ 3.8 | 77.4 | 84.8 | 7.4 | 9.6 |
| TEST-6 | EAE (40) + AMP (10) + P (3) | EAE 1.055 | AMP 0.264 | P 0.082 | EAE 51.9 | AMP 3.9 | P 6.4 | 62.3 | 71.3 | 9.0 | 14.5 |
| TEST-7 | EAE (40) + AMP (10) + AEPRZ (3) | EAE 1.075 | AMP 0.269 | AEPRZ 0.056 | EAE 52.9 | AMP 4.0 | AEPRZ 3.8 | 60.7 | 65.8 | 5.1 | 8.4 |
| TEST-8 | BAE (40) + AMP (10) + AEPRZ (3) | n-BAE 1.002 | AMP 0.329 | AEPRZ 0.068 | n-BAE 45.3 | AMP 4.9 | AEPRZ 4.6 | 54.9 | 63.9 | 9.0 | 16.5 |
| TEST-9 | BAE (40) + AMP (10) + P (3) | n-BAE 0.979 | AMP 0.322 | P 0.1000 | N-BAE 44.2 | AMP 4.8 | P 7.8 | 56.9 | 60.9 | 4.0 | 7.0 |
| COMPARATIVE-1 | EAE (50) + AEPRZ (3) | EAE 1.344 | AEPRZ 0.056 | — | EAE 66.2 | AEPRZ 3.8 | — | 69.9 | 68.8 | −1.0 | −1.5 |
| COMPARATIVE-2 | DEA (50) + P (3) | DEA 1.283 | P 0.117 | — | DEA 20.2 | P 9.2 | — | 29.5 | — | — | — |
| COMPARATIVE-3 | HEP (50) − P(5) + MDEA (30) | HEP 0.154 | P 0.233 | MDEA 1.012 | HEP 7.9 | P 18.3 | MDEA 3.2 | 29.5 | — | — | — |

*1 M(mol/liter) conversion of a ratio of the weight percent (The sum of the components is 1.4 M.)
*2 (Singular performance at 1.4 M) ÷ 1.4 × (Molar content)
*3 The sum of singular performance of each of the components in the amount corresponding to the content (without interaction)
*4 (Compound liquid measured) − (Linear prediction)
*5 (Synergetic effect) ÷ (Linear prediction) × 100

As shown in Table 1, in all of test examples 1 to 9, linear predictions were approximately equal to or higher than 55, and all of the actual measurements with the compound liquids greatly exceeded the linear predictions, allowing us to confirm the synergetic effect of the ternary system.

On the contrary, in the comparative example 1, the linear prediction was approximately 70; however, the actual mea- 1-(2-aminoethyl)piperazine (AEPRZ) and any one of piperazine (P), methylpiperazine (MP), 2-amino-2-methylpropanol (AMP) and piperidinol (PDN);
piperazine (P) and piperidinol (PDN);
methylpiperazine (MP) and piperidinol (PDN); and
2-amino-2-methylpropanol (AMP) and piperidinol (PDN); and water;
wherein the main component accounts for 30 to 55 weight percent, the minor components account for 20 to 1 weight percent, and the water accounts for the remaining weight percent.

2. A $CO_2$ or $H_2S$ reducing apparatus that reduces $CO_2$ or $H_2S$ contained in gas, the $CO_2$ and $H_2S$ reducing apparatus comprising:
an absorber that brings gas containing $CO_2$ or $H_2S$ into contact with absorbent to reduce $CO_2$ or $H_2S$ contained in the gas; and
a regenerator that recycles a solvent that has absorbed $CO_2$ or $H_2S$, wherein
the solvent having $CO_2$ or $H_2S$ reduced and recycled in the regenerator is reused in the absorber, and
the absorbent according to claim 1 is used.

3. A $CO_2$ or $H_2S$ reducing method comprising:
reducing $CO_2$ or $H_2S$ in gas by bringing the gas containing $CO_2$ or $H_2S$ into contact with absorbent, and
recycling a solvent that has absorbed $CO_2$ or $H_2S$ so that the solvent having $CO_2$ or $H_2S$ reduced and recycled is reused, wherein
the absorbent according to claim 1 is used as the absorbent.

\* \* \* \* \*